United States Patent
Verma et al.

(10) Patent No.: US 10,884,810 B1
(45) Date of Patent: Jan. 5, 2021

(54) WORKLOAD MANAGEMENT USING BLOCKCHAIN-BASED TRANSACTION DEFERRALS

(71) Applicant: Amazon Technologies, Inc., Seattle, WA (US)

(72) Inventors: Prashant Verma, Seattle, WA (US); Ronil Sudhir Mokashi, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 498 days.

(21) Appl. No.: 15/815,661

(22) Filed: Nov. 16, 2017

(51) Int. Cl.
*G06F 9/50* (2006.01)
*H04L 29/08* (2006.01)

(52) U.S. Cl.
CPC ............ *G06F 9/505* (2013.01); *G06F 9/5061* (2013.01); *H04L 67/02* (2013.01); *G06F 9/5083* (2013.01); *H04L 67/101* (2013.01); *H04L 67/1008* (2013.01)

(58) Field of Classification Search
USPC ........................................................ 707/720
See application file for complete search history.

(56) References Cited

U.S. PATENT DOCUMENTS

| | | | |
|---|---|---|---|
| 5,675,791 A | 10/1997 | Bhide et al. | |
| 6,950,848 B1 | 9/2005 | Yousefizadeh | |
| 7,103,908 B2 | 9/2006 | Tomsen | |
| 10,291,413 B2* | 5/2019 | Ramathal | G16H 10/60 |
| 10,469,248 B2* | 11/2019 | Chalakudi | H04L 9/0618 |
| 10,504,179 B1* | 12/2019 | McGuire | G06Q 40/04 |
| 10,581,591 B1* | 3/2020 | Branton | H04L 9/0822 |
| 2016/0028552 A1 | 1/2016 | Spanos et al. | |
| 2017/0017955 A1* | 1/2017 | Stern | H04W 4/02 |
| 2017/0228731 A1* | 8/2017 | Sheng | G06Q 20/401 |
| 2017/0344987 A1* | 11/2017 | Davis | H04L 63/06 |
| 2017/0352027 A1* | 12/2017 | Zhang | H04L 9/0825 |
| 2018/0068130 A1* | 3/2018 | Chan | G06F 21/606 |
| 2018/0130034 A1* | 5/2018 | Taylor | G06Q 20/3674 |
| 2018/0173719 A1* | 6/2018 | Bastide | G06F 40/166 |
| 2018/0203992 A1* | 7/2018 | Kilpatrick | G06F 21/44 |
| 2019/0050402 A1* | 2/2019 | Horii | G06F 16/23 |

FOREIGN PATENT DOCUMENTS

CN 106685743 5/2017

OTHER PUBLICATIONS

Spencerd@AWS, "Best Practices in Evaluating Elastic Load Balancing", AWS Articles, Source: https://aws.amazon.com/articles/best-practices-in-evaluating-elastic-load-balancing/ on Oct. 19, 2017, pp. 1-16.
AWS, "Elastic Load Balancing User Guide", (c) 2017 Amazon Web Services, Inc., pp. 1-14.
U.S. Appl. No. 14/966,498, filed Dec. 11, 2015, Christopher Carson Thomas.
U.S. Appl. No. 14/212,023, filed Mar. 14, 2014, Marc John Brooker et al.

* cited by examiner

*Primary Examiner* — Cam Linh T Nguyen
(74) *Attorney, Agent, or Firm* — Robert C. Kowert; Kowert, Hood, Munyon, Rankin & Goetzel, P.C.

(57) ABSTRACT

A determination is made that a request associated with an application is a candidate for blockchain-based deferral. An insertion of a record representing at least the request at a blockchain is initiated. One or more records representing the request are accessed to perform an operation indicated in the request.

20 Claims, 10 Drawing Sheets

WORKLOAD MANAGEMENT USING BLOCKCHAIN-BASED TRANSACTION DEFERRALS

BACKGROUND

More and more business transactions, such as the purchase of retail items, are being conducted over the Internet in recent years. Many organizations, such as large-scale e-retailers, may have inventories comprising millions of items, and tens of thousands of potential item consumers from around the world may interact with such e-retailers concurrently. The rate at which transactions such as item purchases occur in such systems may vary substantially from one time interval to another, but can sometimes be extremely high.

Customer satisfaction with an e-retailer's web sites may be negatively impacted to a significant extent if the sites fail to provide smooth and fast responses to customer requests. In order to try to ensure that customer satisfaction remains high despite widely varying workload levels, a number of approaches may be taken by e-retailers and organizations. Common workload spike management techniques may include, for example, determining the highest anticipated transaction workload for some time interval and then attempting to provision sufficient transaction processing resources (e.g., servers, storage devices, network bandwidth and the like) to meet response time and throughput targets based on the anticipated workloads.

However, dedicating sufficient resources for the highest levels of anticipated workloads may sometimes be wasteful or ineffective—for example, the workload spikes may only last for short time intervals (such as during short pre-holiday sales seasons in the case of online retail establishments), and the predictions themselves may not necessarily be very accurate. Furthermore, even in a scenario in which the resources can be decommissioned after a peak workload period ends, there may be substantial costs associated with repeatedly provisioning resources and then releasing them. If, on the other hand, a lack of sufficient transaction processing resources causes some customer requests to be rejected or perceptibly delayed, this may result in reputational damage and lost revenues. Maintaining high levels of responsiveness for customer-facing transactions without over-provisioning resources remains a non-trivial technical challenge.

Figure 1:
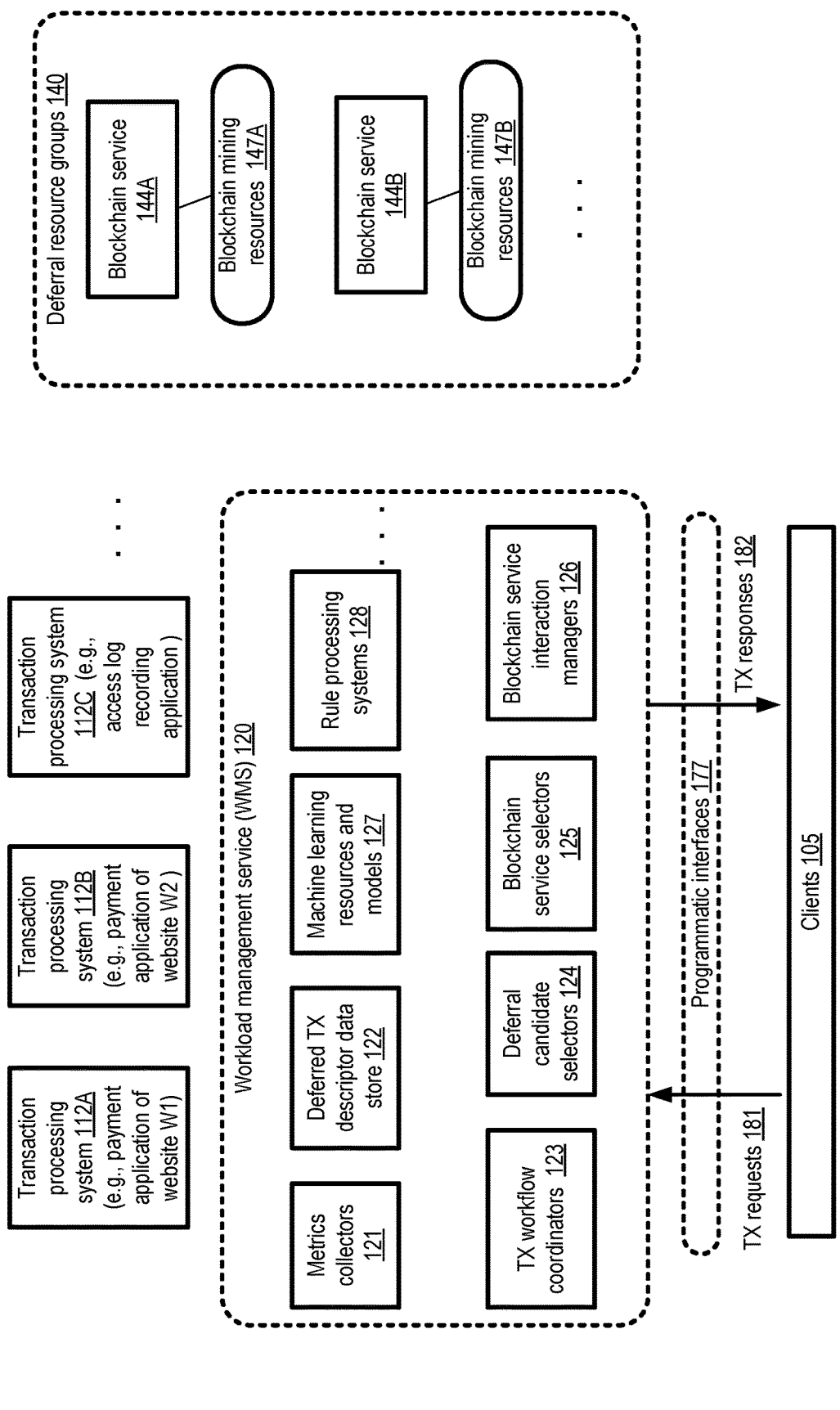
FIG. 1 illustrates an example system environment in which a workload management service may utilize blockchain-based deferral of at least some types of requested transactions, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for handling potentially fluctuating workload levels (e.g., at an e-retailer), as well as other circumstances in which transaction processing resources may be insufficient, using blockchain-based transaction deferrals are described. In various embodiments, a blockchain may comprise a continuously growing list of blocks of data maintained in a decentralized and distributed fashion, with each block comprising one or more records of various types of transactions or events. A given block of a blockchain may comprise, for example, a timestamp (indicating when that given block or its contents were processed or added to the chain) and a link to a previous block. A blockchain may be managed using a peer-to-peer network, with the peers collectively adhering to an agreed-upon protocol for validating new blocks. By design, blockchains are resistant to modification of the block contents; for example, in some implementations, the data in a given validated block may not be altered retroactively without the alteration of subsequent blocks of the chain, and without collusion or agreement among a majority of the peers. As such, in various embodiments a blockchain may serve as an open distributed ledger that can record transactions between various parties efficiently and in a verifiable and permanent manner.

In at least some embodiments, a workload management system comprising one or more computing devices may utilize these blockchain characteristics to facilitate the seamless handling of fluctuations in arrival rates of at least some types of requests, as well as fluctuations in the availability of resources for fulfilling the requests. At a high level, instead of performing the back-end and potentially resource-intensive transaction processing immediately for a selected request, the workload management system may store a permanent record representing the request in a blockchain, and indicate (if necessary) to the transaction requester that the transaction has succeeded. Later, e.g., at some point in time when sufficient back-end resources are available, the transaction processing corresponding to the record stored in the blockchain may be performed. From the perspective of the requester, minimal or no delay may be perceived with respect to the completion of the work involved in the transaction in some embodiments; while from the perspective of the organization managing the transaction processing systems, the utilization of computing resources may be smoothed over time, potentially reducing the required resource investments. It is noted that at least in some embodiments or for some applications, a requester may not necessarily even consider their requests to be structured as transactions as such; from the requester's perspective, requests for operations or services may be submitted, and responses to the submitted requests may be expected. The permanent and open nature of blockchains may help to resolve disputes (if any such disputes were to arise) between the transaction requester and the organization which processes the transactions in various embodiments. In one example scenario, a transaction request may comprise a purchase of an item from an e-retail web site, with a particular funding source such as a credit card being indicated for the item's purchase price. If a decision to use blockchain-based deferral is made at the workload management system for the purchase in some embodiments, an insertion of a record representing the purchase into a blockchain may be initiated, and the purchaser may be informed that the purchase has succeeded without necessarily utilizing resources of a back-end transaction processing system which may normally be used for purchase processing. An amount corresponding to the purchase price may later be deducted using the back-end transaction processing resources, e.g., based on an examination of one or more records representing the transaction that were stored in response to receiving the transaction request.

The nature of contents of the record entered into the blockchain may vary in different embodiments—e.g., in some embodiments, an encrypted value derived from the attributes or properties of the requested transaction may be stored in the blockchain, while in other embodiments plain text versions of at least some attributes may be stored. Encryption techniques may be especially useful in embodiments in which the contents of the blockchain that is used are publicly visible. In at least one embodiment, in addition to storing a record of the transaction request in a blockchain, another record comprising information that may be useful in performing the back-end work of the transaction may be stored at a low-overhead private data store, such as a key-value data store which does not fully support the ACID (atomicity, consistency, isolation and durability) properties of the relational data model. A mapping between the transaction request, the blockchain record generated for the transaction request, and the additional record stored in the low-overhead data store may also be generated and stored in some embodiments, and used later to implement the operations corresponding to the request at the back-end transaction processing layer.

According to at least one embodiment, a network-accessible workload management service which utilizes blockchain-based transaction deferrals may be implemented at a provider network or cloud computing environment. As discussed below in further detail, resources of the provider network may be used in various ways to support blockchain-based transaction deferrals in different embodiments—e.g., some of the processing or computations associated with the blockchain may potentially be performed using computing devices of the provider network. Blockchain services that are outside the provider network (e.g., publicly usable blockchain services), and/or blockchain mining resources contributed by individuals or businesses in return for compensation from an organization on whose behalf the deferrals are performed, may also or instead be used in other embodiments. The set of resources (which may, for example, include computing devices at which the blockchain mining computations are performed) used for permanently storing records of deferred transactions pertaining to a particular application may be referred to as a deferral resource group in various embodiments.

In some embodiments, a workload management service may be set up to manage workload fluctuations for more than one application—e.g., for multiple retailing web sites with respective back-end transaction processing systems, for an application requiring the storage of audit logs indicating logins/logouts, for an application involving the storage of records of time-sensitive submissions of documents such as legal or tax documents, and so on. In one embodiment, a determination may be made at the workload management service that a particular transaction request directed to a first application is a candidate for blockchain-based deferral. The request may indicate one or more operations to be implemented on behalf of a particular entity or requester (such as the deduction of a purchase price for an item from some funding source); as mentioned above, the requester may not necessarily be aware of the concept of transactions as such, and may simply be interested in the timely completion of the requested operation(s). The decision to designate the request as a candidate for deferral may be made based on any combination of a variety of factors in different embodiments. For example, in some embodiments the decision may be made based at least in part on (a) determining that the particular requester is a member of a particular category of clients of a network-accessible service (such as a highly-trusted category of clients who have excellent bill payment records), (b) determining that a measured resource usage metric of a set of resources associated with the first application exceeds a threshold, (c) predicting a probability associated with a workload level of the first application during a time interval, or (d) determining that one or more resources associated with the first application are unavailable or expected to be unavailable. In some embodiments, a deferral suitability score generated using one or more machine learning models and/or rule processing systems may be used to make the decision.

In embodiments in which multiple deferral resource groups (e.g., multiple blockchain services) are available, one or more components of the workload management service may be responsible for selecting the particular resource group to be used for the to-be-deferred transaction. An insertion of a first record representing the transaction into a blockchain of the deferral resource group may be initiated in various embodiments. Prior to implementation of the transaction's operations at the back-end transaction processing system used for the first application, in various embodiments an indication may be provided to the transaction requester via a programmatic interface that the operation has succeeded. The actual implementation of the operation(s) of the transaction may be initiated, e.g., asynchronously with respect to the success indication, and the implementation may comprise accessing at least one record (such as the record stored in the blockchain) representing the transaction. In at least one embodiment, in addition to informing a transaction requester that their request has succeeded, an indication may also be provided that it may take some time to complete at least a part of the work associated with the request. For example, in a scenario where the transaction comprises a purchase of an item from an e-retail web site, the success indicator may communicate to the purchaser that the purchase price will be deducted soon from the funding source (e.g., a credit card). Such a notification may in some cases help to avoid confusion—e.g., if no indication is provided that a slight delay may occur before a credit card is charged for the purchase price, and the purchaser checks their credit card transaction history, the fact that the purchase amount was not deducted even though the purchase was successful may potentially be puzzling. For other types of applications, such notifications of the deferrals may not be provided in at least some embodiments. For some applications, a notification of the success of a request may not be needed in various embodiments—e.g., in an auditing-related application, an indication that a record of an event has been successfully stored may not be provided.

In at least some embodiments, at least a portion of the content of the record stored in the blockchain may be accessible to the transaction requesters. For example, in one embodiment, the workload management system may implement a programmatic interface (e.g., a web-based console, a graphical user interface, a set of application programming interfaces or APIs, and/or a command-line tool) that can be used to view blockchain contents (e.g., in response to queries from the requesters and/or other parties). In other embodiments, programmatic interfaces implemented by a blockchain service may be used.

At least some types of blockchain computations (known as mining operations) may typically require non-trivial amounts of computational power. In at least one embodiment, an organization such as an e-retailer may enable entities (e.g., individuals or small businesses) that have spare computing capacity to participate in the blockchain computations used for workload management, e.g., in return for compensation provided by the organization. In some embodiments, a resource contribution request may be submitted by such an entity to the organization, indicating one or more of the entity's resources usable for blockchain computations. The entity's resources may then be registered as members of a deferral resource group, and used for one or more blockchain computations. The organization on whose behalf the blockchain computations are performed may provide an indication of the compensation policy associated with the computations—e.g., some units of an e-retailer-specific currency or "e-retail coin" may be provided for the use of the registered resources for blockchain mining.

In some embodiments in which the workload management service is implemented at a provider network for an application, the back-end transaction processing systems of the application may also be implemented at the provider network. In other embodiments, the workload management service may be used in various ways for applications that are implemented outside the provider network. For example, consider a scenario in which a small business organization SBO1 executes an application A1 using some resources external to a provider network at which a blockchain-based workload management service WMS1 is implemented. SBO1 may utilize WMS1 to handle fluctuations in A1's workload in some embodiments, e.g., by allowing WMS1 to make workload deferral decisions, by using blockchain services associated with WMS1, and/or by using cached trust scores generated for various transaction requesters at WMS1, as discussed below in further detail.

Example System Environment

FIG. 1 illustrates an example system environment in which a workload management service may utilize blockchain-based deferral of at least some types of requested transactions, according to at least some embodiments. As shown, system 100 comprises various components of a workload management service (WMS) 120 established to orchestrate the scheduling of requests directed at one or more transaction processing systems 112, such as 112A-112C. The components of the WMS 120 may be implemented using one or more computing devices in various embodiments. As shown, the WMS 120 may include one or more transaction workflow coordinators 123, deferral candidate selectors 124, blockchain service selectors 125, blockchain service interaction managers 126, metrics collectors 121, a deferred transaction descriptor data store 122, machine learning resources and models 127 and/or one or more rule processing systems 128 in the depicted embodiment. Incoming transaction requests 181 submitted by clients 105 of the transaction processing systems 112 may be managed using one or more request queues in some embodiments. Responses 182 to the transaction requests may be provided to the clients, with the exact content of the responses in some cases being dependent on whether the transaction requests were deferred or not, as discussed below in further detail.

Each of the transaction processing systems 112A may, for example, comprise respective sets of computing devices configured to implement fairly complex and/or resource-intensive logic for transactions directed to respective applications. Transaction processing system 112A may, for example, comprise one or more database management systems, authorization systems, and the like used for an application that processing payments directed to a particular web site W1. Similarly, transaction processing system 112B may be used for a payment processing application of some other web site W2, and may comprise its own sophisticated database and algorithms in the depicted embodiment. Transaction processing system 112C may be established for an audit log recording application or service—e.g., a service at which events or actions such as login and logout operations of a particular managed environment are to be recorded securely for auditing or other purposes. The transaction processing systems 112 may also be referred to as back-end processing systems, as they may typically not be accessed directly by customers or consumers of the services being provided—instead, for example, an intermediary such as the WMS may be responsible for receiving transaction requests and forwarding them to the transaction processing systems. In at least some embodiments, the transaction processing systems 112A may each be provisioned with sufficient computing, storage and/or networking capacity to support a respective workload expected to result in a targeted acceptable range of resource utilization levels, with the intention of using a blockchain-based transaction deferral mechanism of the WMS 120 to respond gracefully to workload spikes, outages of back end resources, and so on.

In the embodiment shown in FIG. 1, the transaction workflow coordinators 123, implemented at one or more computing devices, may be responsible for orchestrating the overall response to submitted transaction requests, delegating sub-tasks to other components of the WMS 120 as needed. As transaction requests 181 are received via programmatic interfaces 177 (e.g., web-based consoles, graphical user interfaces, command line tools, APIs or the like) from various clients 105 of the transaction processing systems 112, the requests may be handled in a FIFO order using one or more request queues in some embodiments. In some embodiments, queues may not be used; instead, for example, a respective thread or process from a pool of request handlers may be assigned to each request received.

A determination may be made, e.g., by a deferral candidate selector 124, as to whether a given transaction request 181 should be deferred using a blockchain mechanism or not. If the decision is to not defer the transaction request, the request may be passed on to the appropriate transaction processing system 112 in some embodiments for further processing, and a response 182 may be provided to the transaction request based on the output received from the transaction processing system 112. In one embodiment, depending on status information obtained at one or more metrics collectors 121 from the back-end transaction processing systems, a decision may sometimes be made to drop or reject a not-to-be-deferred transaction request 181, e.g., if the workload level of the back-end exceeds a threshold level. A number of factors may be used singly or in combination to designate a transaction request as a candidate for deferral in different embodiments. For example, if the requester of the transaction is a member of a particular category of clients of the back-end system, the transaction may be deferred if a measured resource usage metric of the back-end system (obtained at metrics collectors 121) exceeds a threshold in some embodiments. In other embodiments, a probability associated with a workload level during an upcoming time interval may be used to make a deferral decision, or information about the planned or unplanned unavailability of some of the resources of the back-end service may be used. In at least some embodiments, one or more machine learning models 127 may be used to generate a deferral suitability score for individual ones of the transactions or groups of transactions, and the scores may guide the decision of the candidate selectors 124. Any combination of a variety of machine learning models may be used in different embodiments, such as regression models, decision-tree based models (e.g., random forest models), neural network based models, and the like. In some embodiments, instead of or in addition to using machine learning models, one or more rule processing systems 128 may be used to decide whether to defer a given transaction request. Any of a variety of rule processing systems of differing levels of sophistication may be used in different embodiments. Some rule processing systems 128 may, for example, apply a set of heuristics to make deferral decisions, or consult lookup tables, white lists, black lists and the like which indicate whether transactions from a given requester or class of requester should be deferred, and so on. In some embodiments, for at least some time intervals (e.g., during periods when workloads at one or more transaction processing systems 112 is expected to be very high), all transaction requests received may be deferred using blockchains.

If a decision to defer a transaction request is made, a particular group 140 of deferral resources at which a blockchain is implemented for storing records of the transaction requests may be selected, e.g., by one or more blockchain service selectors 125 in the depicted embodiment. In some embodiments in which multiple blockchain services 144 (such as 144A or 144B) with respective blockchain mining resources 147 (e.g., 147A or 147B) are available, respective blockchain services may be designated to store transaction request records of different applications. In other embodiments, a given blockchain service 144 may be used to store records associated with multiple applications. Any combination of a number of factors may be used to select a particular blockchain service 144 for a given transaction request in the depicted embodiment, such as the currently estimated costs (in time or in resources) of adding a record to the service's blockchain, the relative urgency or priority of the transaction, and so on. A blockchain service interaction manager 126 may be used to transmit a request to add a record indicating a deferred transaction to the blockchain of a selected deferral resource group 140 in the depicted embodiment, e.g., by invoking one or more APIs of the blockchain service. The record may, for example, include encrypted or hashed representations of various attribute or properties of the transaction request, such as an identity of the requester, a timestamp indicating when the transaction was received, data elements (such as a purchase amount and a funding source identifier, in the case of item purchase transaction requests) to be used to eventually commit the transaction at the back end, and so on. In one embodiment, at least some portions of the attributes or properties of a transaction record may be stored in unencrypted form in the blockchain, e.g., enabling the transaction requester to at least partially verify that the request was recorded correctly.

In at least some embodiments, depending on the details of the application, an additional descriptor of the transaction request may be stored at a low-overhead data store 122 (e.g., low-overhead relative to more resource-intensive data stores of the back-end transaction processing systems). In some embodiments, as shown in FIG. 1, the deferred transaction descriptor data store 122 may be part of, or managed by, the WMS 120 itself; in other embodiments, the data store may be external to the WMS 120.

In various embodiments, a response 182 indicating that the requested transaction has succeeded may be provided to the transaction requester via interfaces 177 after the request to add a record to the block chain has been transmitted to the deferral resource group 140, even though the operations required to complete the transaction processing at the back-end system may not yet have been completed or even initiated. In other embodiments, depending for example on the nature of the application whose transactions are being deferred, a success indicator may not be required. Eventually, based on the analysis of one or more stored records of the transaction request (e.g., stored at the blockchain and/or at the data store 122), the needed operations may be performed at the back-end transaction processing system, e.g., when sufficient resources are available at the back-end system. The record stored at the blockchain may serve as a permanent indicator (at least in some cases accessible to the transaction requester) that the corresponding transaction request was designated as a success in the depicted embodiment.

It is noted that although in some embodiments, transaction deferrals using the blockchain-based technique outlined above may be employed in response to detected or predicted resource insufficiency at the back-end transaction processing systems 112, in other embodiments the deferrals may be performed regardless of the workload or resource availability at the corresponding back end systems. That is, blockchains may be used in some embodiments as a way of implementing decentralized transaction processing for various applications, and their use may not necessarily be based on available resource capacity considerations.

A number of different categories of blockchain computation resources 147 may be used in some embodiments. For example, in some cases, resources associated with a provider network at which the WMS 120 is implemented may be used to perform the computations. In other scenarios, resources external to the WMS's provider network may be used—for example, idle compute cycles of individuals' home computers or office computers may be deployed for the computations in some embodiments, in return for compensation offered by the transaction processing system applications.

In at least some embodiments, the functionality of several of the subcomponents of the workload management service 120 may be implemented using a single computing device. For example, separate processes, threads or devices may not be required for metrics collection, transaction workflow coordination, deferral candidate selection and the like.

High-Level Transaction Workflows

Figure 2:
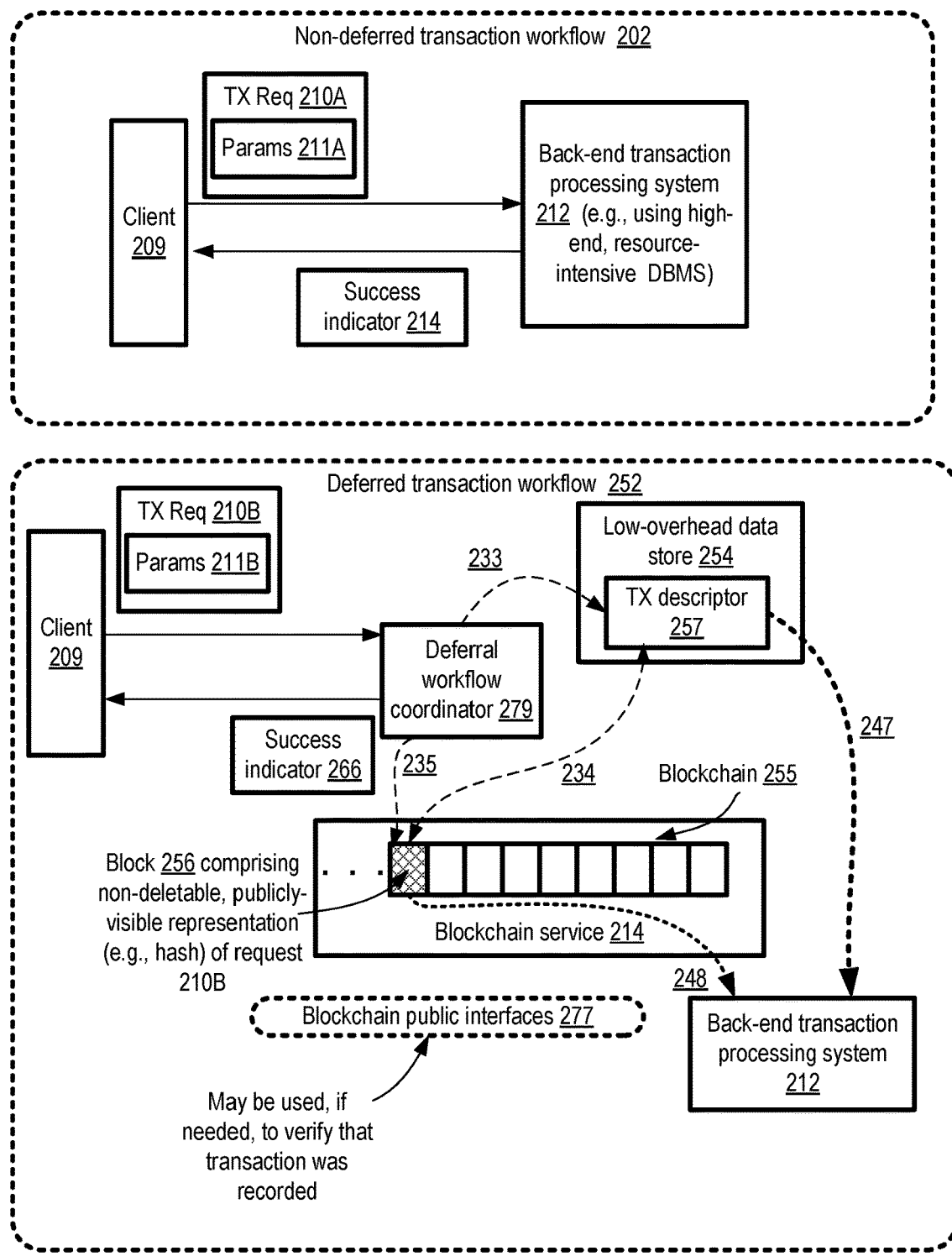
FIG. 2 illustrates example high level workflows for non-deferred and deferred transactions, according to at least some embodiments.

FIG. 2 illustrates example high level workflows for non-deferred and deferred transactions, according to at least some embodiments. In the case of a transaction that is not deferred, the workflow 202 may be relatively straightforward. A transaction request 210A, comprising representations of various parameters/attributes 211A associated with one or more operations to be performed (such as a deduction of an amount from a funding source as a payment for some item), may be received at the workload management service from a client 209. Since a decision is made not to defer the transaction, the request may be forwarded to a back-end transaction processing system 212 in the depicted embodiment. The back-end transaction processing system 212 may, for example, comprise a high-end, relatively resource-intensive database management system and/or other subcomponents in some embodiments. Assuming that the back-end system has sufficient resource available to perform the operations indicated by the transaction parameters/attributes 211A, a success indicator 214 may be provided to the transaction requester client 209 (e.g., via the workload management service). In some cases, the workload management service may apply some transformation functions to the transaction request and the response—e.g., the format in which the request is presented to the back-end system may differ from the format in which the request is received, and similarly the format in which the success indicator response 214 is provided to the requester may differ from the format in which the result of the transaction is received from the back-end transaction processing system.

The workflow 252 of a transaction which is deferred using a blockchain mechanism may be somewhat more complex in the depicted embodiment. When a transaction request 210B is received at the workload management service from client 209, at least two types of records may be created in some embodiments. A record representing the transaction request, including for example a timestamp indicating when the request was received, and/or a subset of the parameters/attributes 211B of the request may be stored in a block 256 of a blockchain 255 maintained at a blockchain service 214 in the depicted embodiment, as indicated by arrow 235. In some implementations, a single record stored at the blockchain may represent multiple deferred transaction requests. Such bundling or batching of information pertaining to deferred requests may help reduce overall deferral-related resource usage, e.g., by reducing the number of network messages that are transmitted. Additionally, in some embodiments, as indicated by arrow 233, a transaction descriptor 257 may be stored in a low-overhead data store 254. A mapping indicating the relationship between the descriptor 257 and the record in block 256 may be stored in some such embodiments, as indicated by arrow 234—e.g., the address or identifier of the blockchain record may be stored in the transaction descriptor, and/or an address or identifier of the descriptor may be stored in the block 256. Collectively, the transaction descriptor and the record in the blockchain 214 may comprise information sufficient to enable the back-end transaction processing system 212 to perform the operation or operations requested as part of the transaction in the depicted embodiment. A success indicator 266 may be provided, e.g., by the deferral workflow coordinator 279 to the transaction requester client 209 in the depicted embodiment. The timing of the transmission of the success indicator may vary in different embodiments—e.g., in some embodiments the success response may be sent as soon as the transaction descriptor 255 is stored, in other embodiments the deferral workflow coordinator may transmit the success response as soon as the record is submitted to the blockchain service for inclusion in the blockchain 255, and so on.

In various embodiments, asynchronously with respect to the success response transmission, the information needed to perform the transaction's operations may be obtained by the back-end transaction processing system, as indicated by arrows 248 and 247. The back-end transaction processing system may then perform the requested operations.

It is noted that in some scenarios, typically with low probability, it may not be possible for the back-end transaction processing system 212 to complete the requested operation in the depicted embodiment. For example, in the case of a payment being made using a credit card, the credit limit of the card owner may have been exceeded, and there may not be sufficient funds available to successfully complete the payment. In such scenarios, the entity or organization which owns/manages the application using the back-end transaction processing system may have to fulfill the obligations implied by the success indicator 266—e.g., the item for which the purchase transaction was requested may have to be provided to the purchaser, even though insufficient funds were available. To reduce the number of occurrences of such problematic scenarios, transactions may be selected for deferral based on careful analysis in various embodiments—e.g., only transactions of those customers of an e-retailer who have reliably paid their bills in the past may be selected for deferral in some embodiments. Further details regarding factors which may be used in different embodiments to select transactions for deferral are provided below.

In at least some embodiments, public interfaces 277 of the blockchain service 214 may enable clients 209 to verify that their transaction request was recorded. For example, a client may submit queries regarding specific transaction requests, or all of the transaction requests that the client has submitted over some time interval, and the records stored at the blockchain may be used to respond to the queries. In one embodiment, such queries may be handled, at least initially, at the workload management service, and the workload management service may generate corresponding queries to the blockchain service if needed. In some embodiments, the record stored in the blockchain may contain an encrypted version of a portion of the transaction parameters (e.g., a result of a hash function applied to the parameters); thus, sensitive details regarding the transaction may not be made visible via the blockchain interfaces. In some embodiments, the deferral workflow coordinator 279 may prompt the back-end transaction processing system to implement a deferred transaction—e.g., a message may be sent to the back-end transaction processing system 212 when a determination is made that the back-end has sufficient resource capacity for the deferred transaction to be implemented. In other embodiments the back-end system 212 may be responsible for checking the low-overhead data store 254 and/or the blockchain 255 for deferred transactions, and implementing the transactions as soon as practicable. In at least one embodiment, there may be some overlap or redundancy in the information stored in the blockchain 255 and the information stored in the low-overhead data store 254, and the back-end transaction processing system may only have to access one of the two (either the low-overhead data store or the blockchain) to implement a deferred transaction. In some embodiments, the low-overhead data store may not be used, and all the information needed to implement the deferred transactions may be obtained from the blockchain 255.

Figure 3:
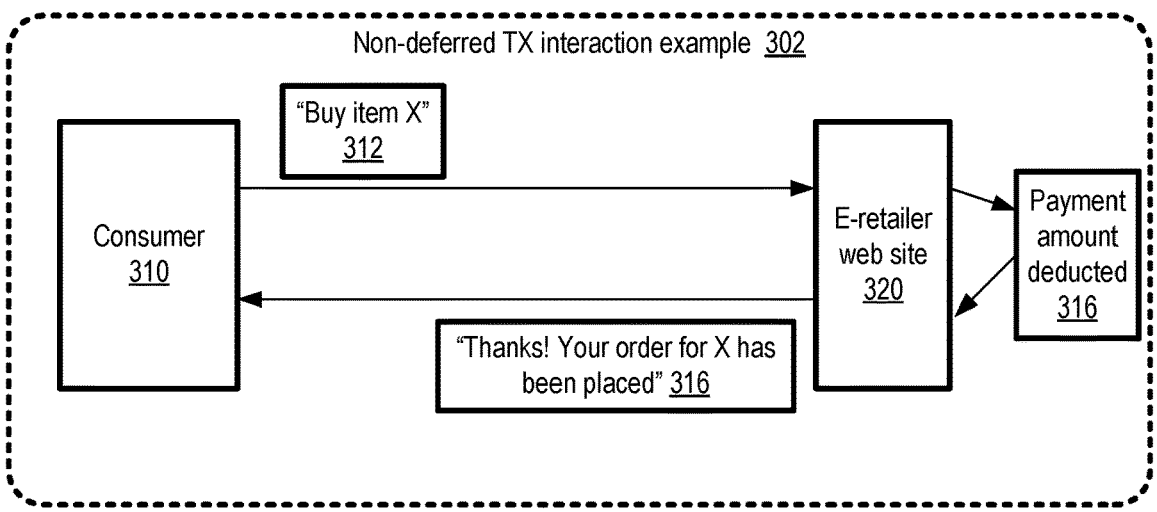
FIG. 3 illustrates examples of respective interactions between retail consumers and an e-retailer web site for deferred and on-deferred transactions, according to at least some embodiments.
Figure 3:
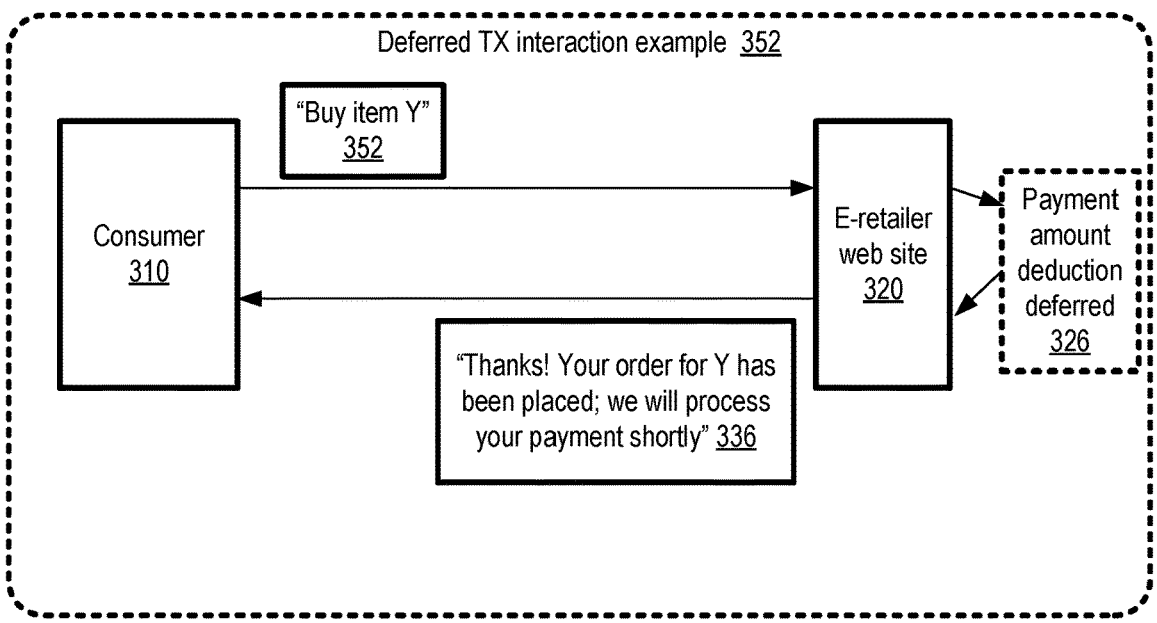

In some embodiments, the responses provided to a client may differ slightly, depending on whether a requested transaction of the client was deferred or not. As indicated earlier, such an approach may be taken to avoid client confusion. FIG. 3 illustrates examples of respective interactions between retail consumers and an e-retailer web site for deferred and on-deferred transactions, according to at least some embodiments. In the example 302 in which a purchase transaction is not deferred, a consumer 310 may submit a request 312 to purchase a selected item X to an e-retailer's web site 320. The payment amount may be deducted from a funding source indicated in the request, as indicated in element 316, and a success response 316 may be provided. A message similar to "Thanks! Your order for X has been placed" may be included in the response to the consumer 310 in the depicted example scenario. If the consumer then checks the funding source, the fact that the purchase amount was deducted may become apparent.

In the deferred transaction example 352, the consumer may submit a similar request to purchase an item Y to the e-retailer web site 320. This time, a decision to defer the transaction may be made as indicated in element 326, which may result in a slight delay in the deduction of the payment amount from the funding source being used for the purchase. The message included in the success response 336 provided to the consumer 310 may include an indication of the possible delay in the depicted embodiment. The inclusion of the phrase "we will process your payment shortly" may signal to the consumer that the amount may not have been deducted before the success response was received. As a result, if the consumer 310 checks the funding source intended to be used for the purchase, the consumer is less likely to be confused if the amount has not yet been deducted. The wording of the communication indicating that at least a portion of processing associated with a particular transaction request has been deferred may, of course, differ from one application to another. If the signal of the possible delay had not been provided in the example scenario shown in FIG. 3, the consumer 310 may be more likely to conclude that their purchase request was not successful, which may lead to problem situations like re-ordering the same item. In some embodiments, a signal indicating that at least a portion of processing associated with a particular transaction request has been deferred may not be required—e.g., in a scenario in which where blockchain-based deferral is used for transactions that comprise storing access log records, messages indicating deferral may not be sent to the entities or individuals interested in monitoring the access logs.

Factors Used to Select Deferral Candidates

Figure 4:
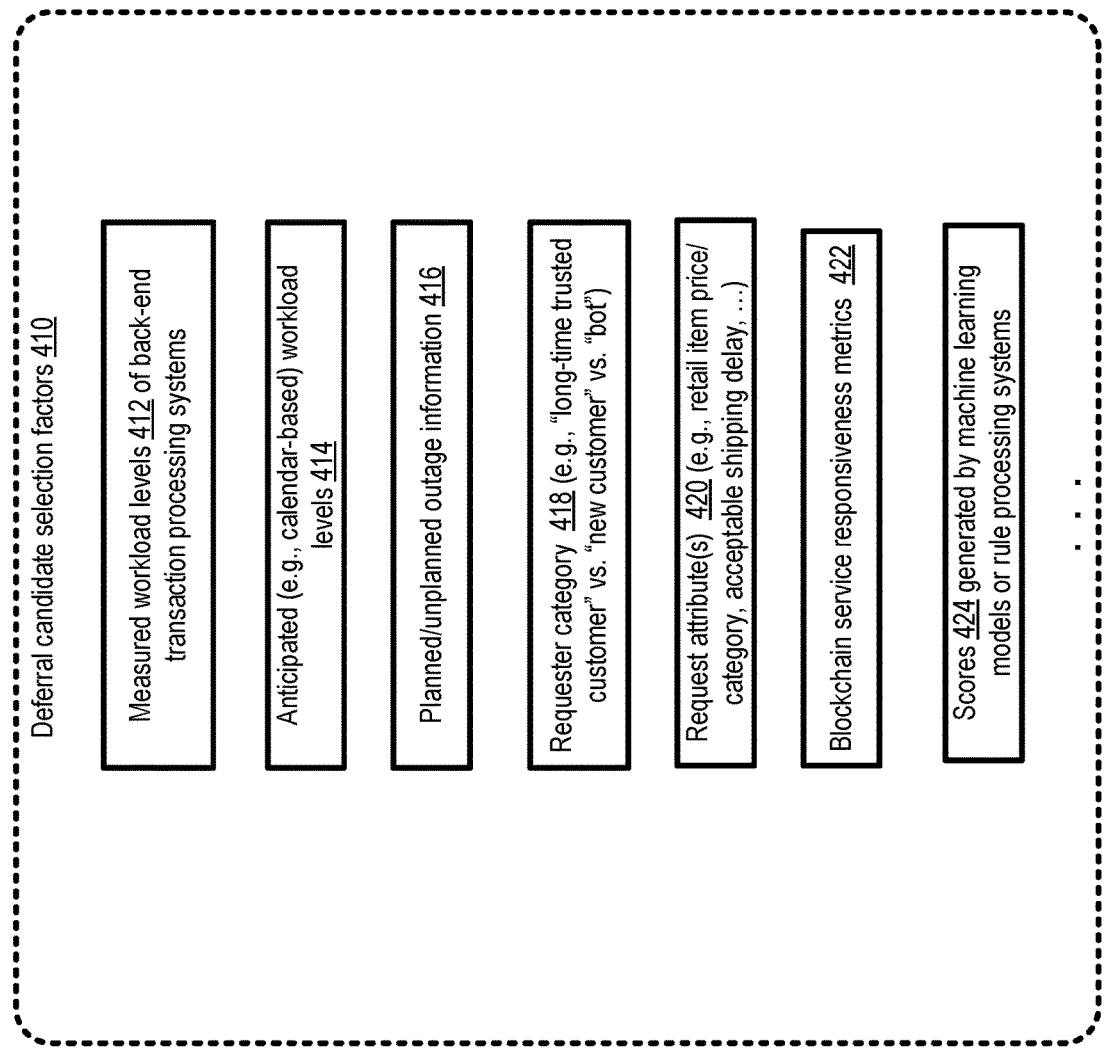
FIG. 4 illustrates example factors which may be considered when selecting transactions for blockchain-based deferral, according to at least some embodiments.

In at least some embodiments, at least some transaction requests received at a workload management service may not be deferred. FIG. 4 illustrates example factors which may be considered when selecting transactions for blockchain-based deferral, according to at least some embodiments. As shown, factors 410 may include, for example, measured workload levels 412 of back-end transaction processing systems for which the workload management service acts as a front-end or intermediary. A number of different types of metrics may be analyzed to determine whether deferring transactions is worthwhile. For example, metrics such as CPU utilizations at various compute servers, network utilization levels at links or paths to/from the back end systems, storage/memory utilization levels, average response times for transactions submitted to the back end system during some recent time interval, trends in such response times, average transaction throughput or trends in throughput may be obtained, and a decision regarding deferrals may be made based on pre-selected thresholds for one or more of the metrics in some embodiments. In at least one embodiment, for example, transactions may not be deferred unless the mean resource utilization for some set of resources over a selected time interval exceeds a threshold such as 60%.

In addition to measured workload levels, in some embodiments, anticipated workload levels 414 in some future time interval may be considered when deciding whether at least a subset of transactions should be deferred using blockchain-based techniques. For example, there may be certain days or weeks of the year (e.g., before or after certain holidays, or during certain long weekends) in which the rate at which consumers purchase items from an e-retail web site are typically much higher than during other times. Based on such calendar-driven considerations, a decision may be made to start deferring some types of transaction requests in the depicted embodiment. Similar anticipatory considerations may be taken into account at other granularities in some embodiments—e.g., for an application which is designed to log records of individuals logging in and out of a network or server, the rate of such logins and logouts may be much higher during some hours of the day than during other hours, so deferrals of one or more logging transactions may be initiated for such peak hours.

Outage information 416, e.g., pertaining to planned outages such as maintenance windows as well as detected unplanned outages, may be used to decide whether transactions should be deferred or not. For example, if a monitoring tool or metrics collector notifies the workload management service that some set of resources of a back end transaction processing system appears to have failed, this may trigger transaction deferrals of at least some requests in the depicted embodiment.

For some application types, it may be possible to subdivide the population of transaction requesters into logical categories in various embodiments, e.g., based on an analysis of past behavior of the requesters. Some customers of an e-retail web site may, for example, be classified as long-time, trusted customers, while others may be classified as new or as-yet-untrusted. It may be less of a risk to defer transactions of some categories of requesters than others—for example, in the case of an e-retailer, payment transactions of long-time customers whose funding sources have always had more than sufficient funds for their purchases may be less risky to defer than payment transactions of newer customers for whom such favorable historical information has not yet been collected. As such, the client or requester category 418 may be used to decide whether a given transaction should be deferred or not in some embodiments. In some embodiments, it may sometimes be the case that transactions directed to an application are submitted using "bots" or automated transaction request generators, e.g., by entities that may have interests or goals that differ from those of the application provider. In one such embodiment, the workload management service may generate (e.g., with the help of machine learning algorithms) a probability indicating whether a given transaction request was submitted by such an automated transaction generator, and reject the transaction request as a deferral candidate if the probability exceeds a threshold. In some cases, the set of potential transaction requesters may be divided into classes, such that requests associated with some requester classes are preferred or prioritized for transaction deferral, while requests associated with other requester classes are not deferred, or deferred less frequently. When a particular transaction request is received, the probability (which may be 100% if the identity of the requester is unambiguous) that the request was submitted by a requester of a particular non-preferred class may be determined in some embodiments, and the request may be rejected as a candidate for deferral based at least in part on the probability. Automated transaction request generators may be considered one such requester class in some embodiments, while item consumers that have poor payment records may be considered another such class.

In at least one embodiment, other attributes 420 of the transaction request itself, such as the item price or item category for a retail purchase, or the acceptable shipping delay, may be useful in determining whether the transaction should be selected as a candidate for deferral. For example, if the purchase amount is below a selected threshold, the risk associated with deferring the transaction may be lower than if the purchase amount is high, making the transaction potentially better suited for deferral. Similarly, for some item categories, an analysis of the history of earlier transactions may suggest that payments are almost always received, so purchases of items of such categories may also be low risks with respect to deferrals. If an item is to be shipped very quickly from an e-retailer, as opposed to being shipped after some days, this may also serve as a signal regarding the suitability of deferral in some embodiments—e.g., items to be shipped immediately may represent higher risks for deferrals.

Metrics obtained from the blockchain services to be used, such as responsiveness metrics 422, may help in making deferral decisions in some embodiments. For example, if the recent average of the time taken to add a block to the blockchain at a particular blockchain resource group or service exceeds a threshold, this may present an unacceptable delay for certain types of transactions in one embodiment; as such, deferrals may not be practical under such circumstances, or a different blockchain resource group may have to be used.

In at least some embodiments, one or more machine learning models and/or rule processing systems may be used to generate, for a given transaction request or a set of transaction requests, respective deferral suitability scores 424 which can then be examined to decide whether to defer the transaction request(s) or not. A variety of machine learning methodologies and model types, such as regression models, decision-tree based models, neural network-based models, time series models, and the like may be used singly or in combination in different embodiments. In some embodiments, trust scores or propensity scores may be generated for respective requesters using machine learning models, and individual requests may be selected for deferral based on the scores of their requesters. In one example scenario in which blockchain-based transaction deferrals are used for a payment application of an e-retailer, the set of features represented in a machine learning model used to generate propensity scores for a given requester may include, among others, one or more of: (a) records of previous purchases by the requester, (b) the categories of items purchased frequently in the past by the requester, (c) average order size or amount of the requester, (d) information about the requester's browsing history at the e-retailer's web site, (e) records of "add-to-shopping-cart" actions of by the requester, (f) records of insertions of items by the requester into "wish lists" and the like, (g) the payment instruments (such as credit cards etc.) used by the requester for earlier transactions, (h) if the requester has a gift card credit balance, the average credit amount on the gift card over some time period, (i) hoe many different delivery addresses have been used by the requester for previous purchases, and so on. The output of the model(s) may comprise a score between 0 and 1, for example, and transactions of the requester may be selected for deferral (if needed) if the requester's score exceeds a threshold value (e.g., 0.9). The threshold may be adjusted over time by the workload management service as needed in various embodiments—e.g., if more transactions are to be deferred due to a detection of greater resource utilization at the back end, the threshold may be lowered at least temporarily.

Several of the factors illustrated in FIG. 4 may be considered in combination when making deferral decisions in some embodiments. In at least some embodiments, for example, variables which represent one or more of the non-machine-learning factors shown in FIG. 4, such as client category, back-end workload level, and so on, may be included in the input provided to the machine learning model(s) or rule processing systems, and used to predict the scores 424. In some embodiments, one or more factors other than those shown in FIG. 4 may be taken into account when determining whether transactions should be deferred; in at least one embodiment, one or more of the factors shown in FIG. 4 may not be considered. In some embodiments, at least temporarily, all transactions requests that are received may be deferred.

Provider Network Environment

Figure 5:
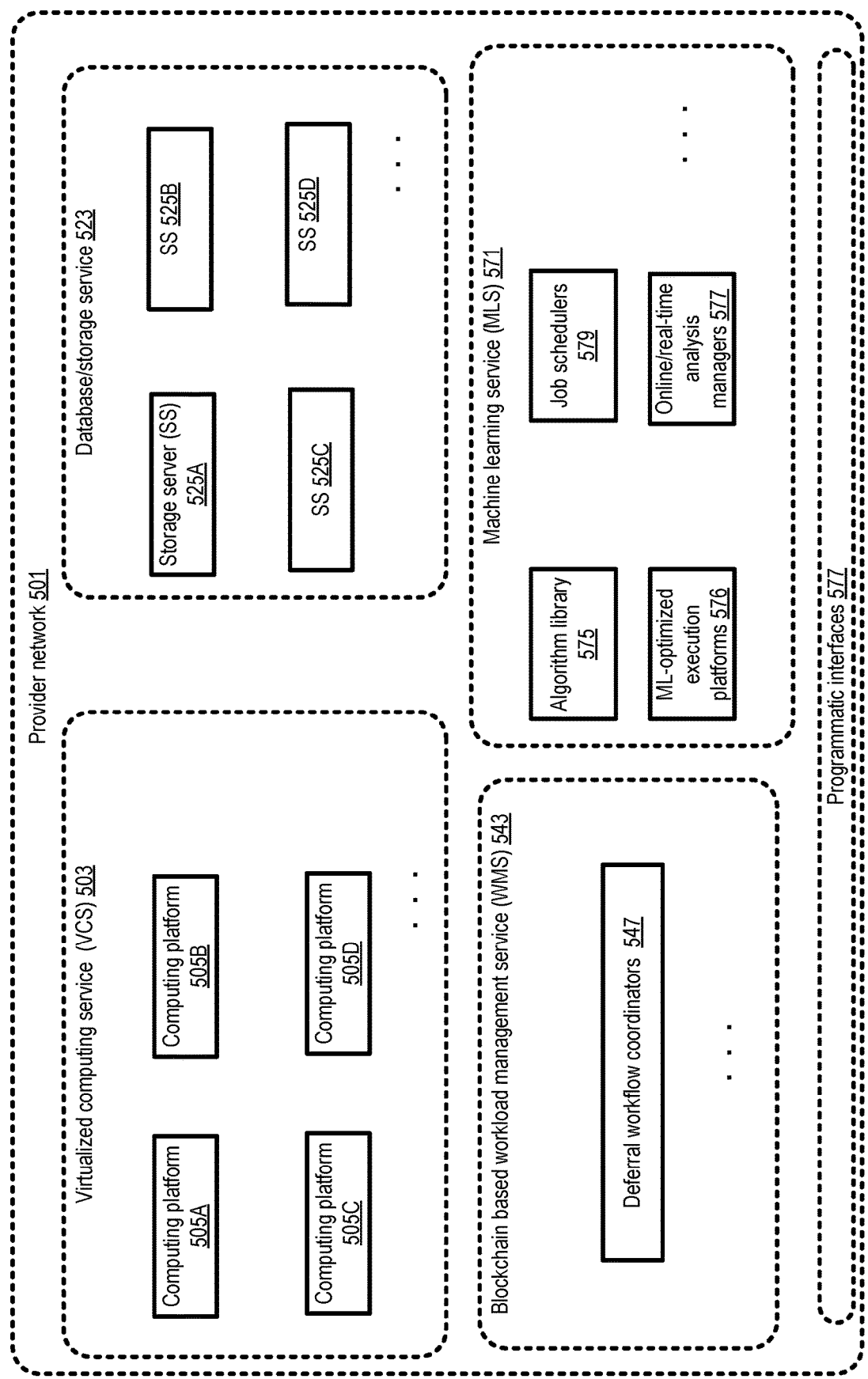
FIG. 5 illustrates an example provider network at which a blockchain-based workload management service may be implemented, according to at least some embodiments.

In some embodiments, as mentioned earlier, the techniques discussed above for deferring transaction requests using blockchains may be implemented at least partly at a provider network. FIG. 5 illustrates an example provider network at which a blockchain-based workload management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries, sometimes in different time zones).

In the depicted embodiment, provider network 501 may comprise resources used to implement a plurality of services, including for example a virtual computing service (VCS) 503, a database or storage service 523, a machine learning service (MLS) 571 and a blockchain-based workload management service (WMS) 543. The WMS may be used as a front-end or intermediary for one or more applications implemented using other services in some embodiments—e.g., a payment processing application for which transaction requests are managed using the WMS 543 may use resources of a database service 523 as the back end transaction processing system. Components of a given service may utilize components of other services in the depicted embodiment—e.g., for some machine learning tasks, a component of the machine learning service 571 may utilize virtual machines implemented at computing platforms such as 505A-505D of the virtualized computing service. Input data, intermediate results, final results and/or other artifacts of various machine learning algorithms or models, such as those used for identifying candidate transactions for blockchain-based deferral, may be stored at storage servers 525 (e.g., 525A-525D) of the database or storage service 523 in some embodiments. Individual ones of the services shown in FIG. 5 may implement a respective set of programmatic interfaces 577 which can be used by external and/or internal clients (where the internal clients may comprise components of other services) in the depicted embodiment.

As shown, the workload management service 543 may comprise, among other components, one or more deferral workflow coordinators 547 in the depicted embodiment. The deferral workflow coordinators 547 may, for example, invoke algorithms selected from the machine learning algorithm library 575 to train and/or execute one or more models used for deferral-related configuration decisions in the depicted embodiment. In some embodiments, requests to train some types of machine learning models may be handled as batch jobs at the machine learning service, and a batch job scheduler 579 may orchestrate the allocation of resources for the jobs as well as dependencies among jobs. In the depicted embodiment, online/real-time analysis managers 577 of the MLS 571 may be responsible for executing the algorithms used to make decisions regarding transaction deferrals. In at least one embodiment, a machine learning service 571 may have access to or include a set of execution platforms 576 that are optimized for machine learning tasks (e.g., platforms that have customized hardware such as GPU arrays and/or customized software stacks). Depending on the suitability of such platforms for transaction deferral-related tasks, one or more execution platforms 576 may be employed by the WMS 543 in the depicted embodiment. In at least one embodiment, resources of the virtualized computing service 503 may be used for blockchain computations. In one embodiment, the low-end data stores used for storing transaction descriptors, and/or the blocks of one or more blockchains, may be stored at a storage service 523.

In at least some embodiments, the workflows discussed earlier for workload management may be accomplished using non-specialized computing platforms of the virtualized computing service 503. In various embodiments, the training and test/evaluation data used for various models for deferral-related operations may be stored at a database/storage service 523. In one embodiment, the techniques described above for deferring transactions using blockchain technology may be implemented without acquiring resources of network-accessible services such as those shown in FIG. 5. For example, a standalone tool implemented at one or more computing devices which are not part of a network-accessible service may be used in some embodiments as a deferral workflow coordinator 547.

Blockchain Mining Resource Options

Figure 6:
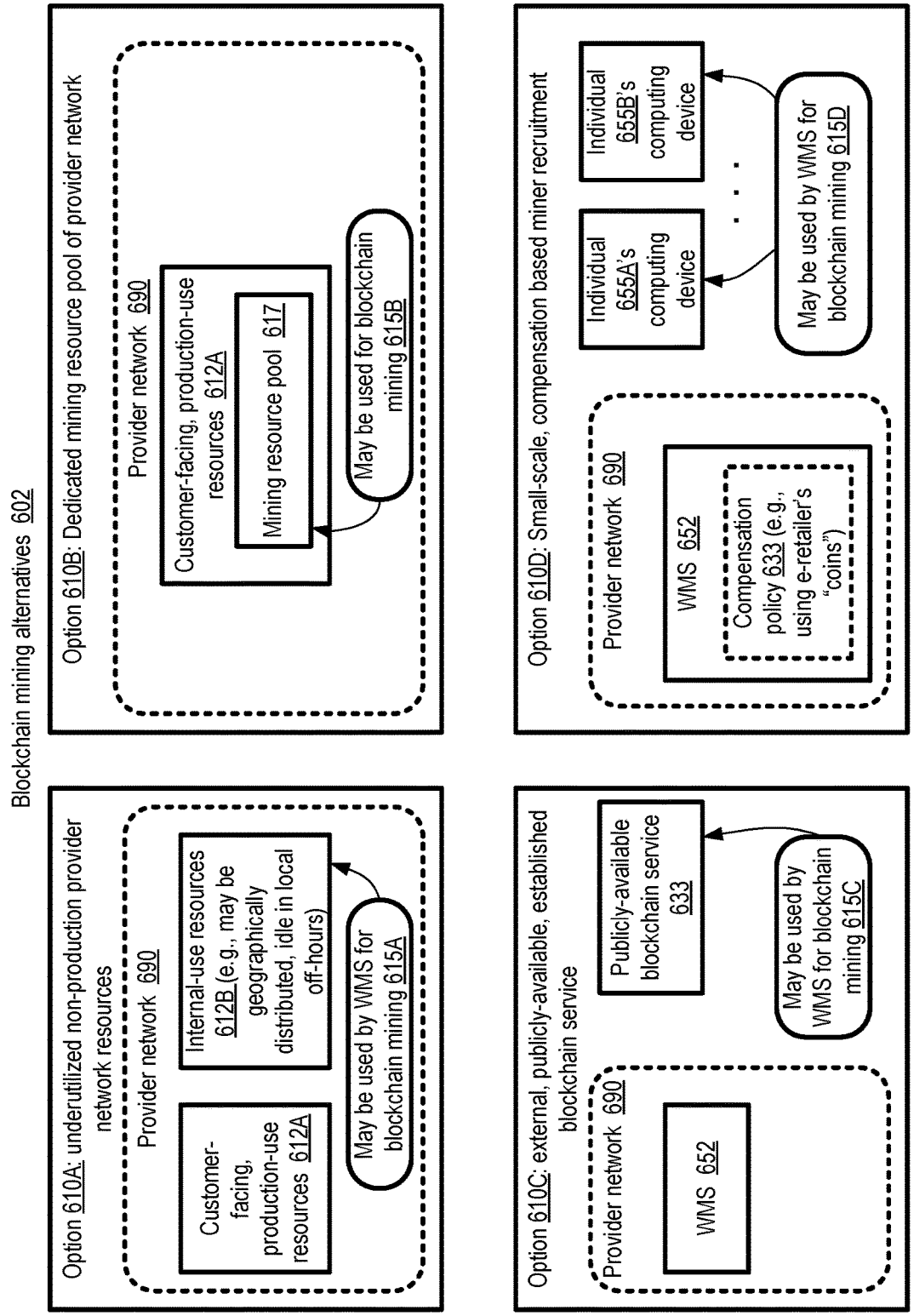
FIG. 6 illustrates alternatives which may be employed for blockchain processing operations, according to at least some embodiments.

As mentioned above, blockchain processing or "mining" may require substantial computing resources in at least some embodiments. For example, in various embodiments, in order to add a block to a blockchain, numerous hashing-related computations may have to be performed on the proposed contents of the block (e.g., on the set of transaction records to be stored in the block, and/or on the remaining portion of the block which does not comprise records) until an acceptable verifiable mathematical result (such as a hash value beginning with a specified number of ones or zeroes) is obtained. Numerous peers (who may also be referred to as blockchain "miners") in the distributed network associated with managing the blockchain may perform such computations in competition with one another, e.g., as there may be rewards associated with being the first one to achieve a desired hash result. FIG. 6 illustrates alternatives which may be employed for blockchain processing operations, according to at least some embodiments. Several of the options shown may be used in combination in one embodiment.

In option 610A, the computing resources available at an organization which implements a provider network 690 at which a workflow management service is implemented may be divided into at least two categories. The first category, 612A, may comprise resources that are used for customer-facing applications in a production environment. The second category 612B may comprise internal-use resources, such as various desktops and laptops designated for office use by employees of the organization, or spare servers that are currently not deployed for a customer-facing applications or services. The internal-use resources 612B may be geographically distributed (e.g., across several time zones) in at least some embodiments, and at least some subset of the internal-use resources may often be idle or underutilized during non-business hours. Some of the internal-use resources may be configured to participate in blockchain mining for deferring transaction requests in the depicted embodiment, as indicated by element 615A.

In option 610B, a dedicated pool of mining resources 617 may be established, e.g., within the customer-facing production-use resources 612A. Such a dedicated pool 617 may, for example, help to assure that at least a minimum amount of computing power is always available for blockchain mining on behalf of a workload management service, as indicated by element 615B.

In option 610C, the WMS 652 may be implemented using resources of the provider network 690, and one or more external, publicly available, established or well-known blockchain services 633 may be used for mining, as indicated by element 615C. Such external blockchain services may be available for use for a variety of applications by different entities, and may be known to the clients of the back end transaction processing systems, which may offer an additional level of reassurance that transaction records are not likely to be lost.

In option 610D, small-scale miners may be recruited by the WMS 652 based on a publicized compensation policy 633. For example, in one embodiment an e-retail organization for which transaction workloads are being managed may indicate that for X number of blocks processed and added by a miner to a blockchain Y "e-retail coins" may be granted to the miner, and that such coins may be redeemed for items of the e-retailer's inventory. Based at least in part on such a compensation policy, various individuals (such as 655A and 655B) or other small-scale entities may decide to add their computing devices to the pool that can be used by the WMS for blockchain mining in some embodiments, as indicated by element 615D. In effect, in such embodiments, blockchain maintenance participation requests may be received at the WMS 652 via a programmatic interface from various entities, indicating one or more resources usable for blockchain computations, and the WMS may enable the use of those resources for the transaction deferral-related computations. To enable the use, in one embodiment the WMS may, for example, perform or request configuration changes associated with the blockchain, adding the newly-offered resources or the entities offering the resources to a list of blockchain maintenance entities or devices.

In some embodiments, several of the techniques shown in FIG. 6 may be employed concurrently. For example, internal-use resources 612B may be used in combination with dedicated mining resource pools 617, external blockchain services 633 and/or small-scale miners in some embodiments. In at least some embodiments, based on measurements of the current performance of a set of mining resources, and of the current need for transaction deferral, additional resources may be deployed (or un-deployed) dynamically for mining if necessary—e.g., the set of mining resources deployed for the WMS may vary over time.

Configuration Parameters for Blockchain-Based Transaction Deferrals

Figure 7:
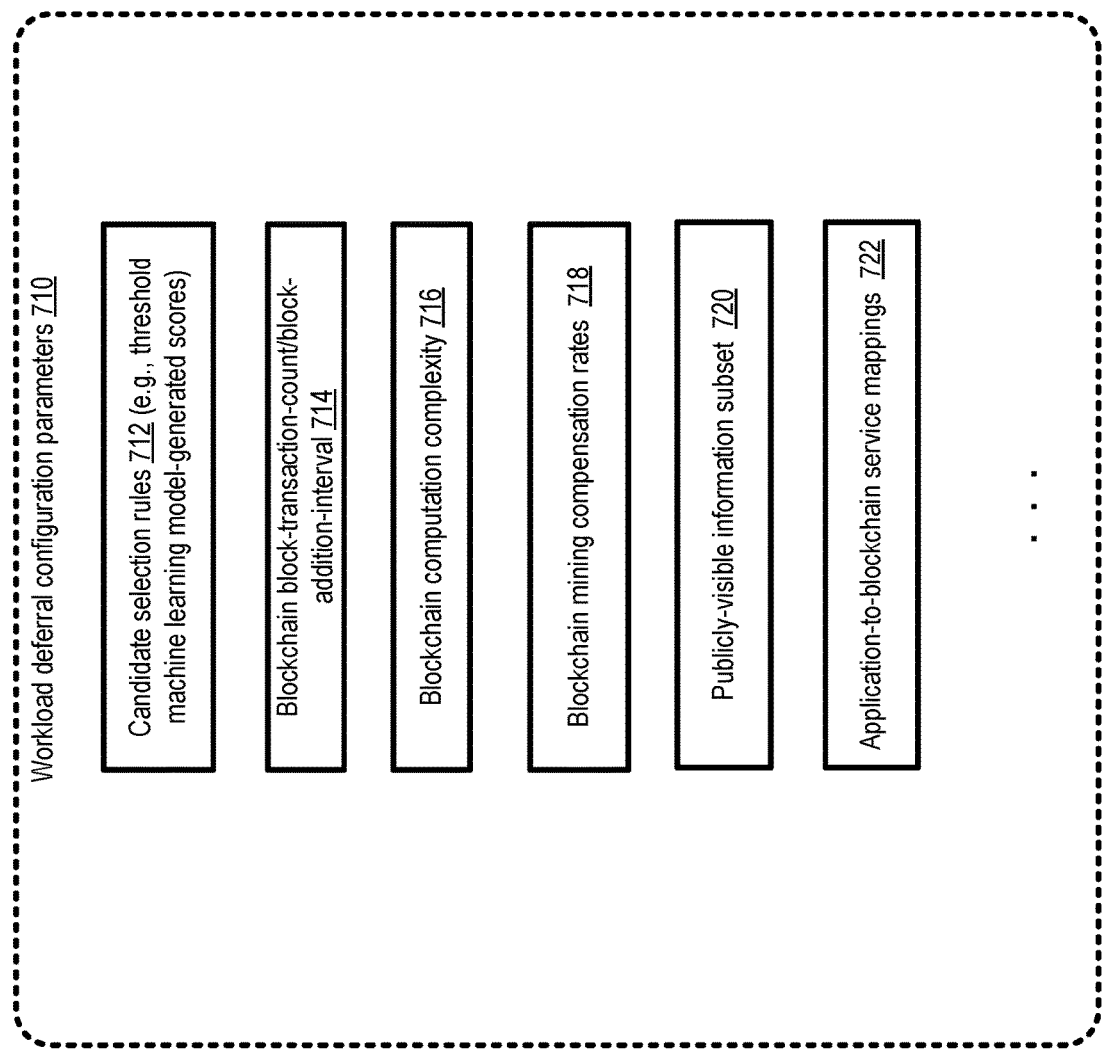
FIG. 7 illustrates example configuration parameters for which values may have to be identified for blockchain-based workload deferral, according to at least some embodiments.

FIG. 7 illustrates example configuration parameters for which values may have to be identified for blockchain-based workload deferral, according to at least some embodiments. Deferral transaction candidate selection rules 712 may have to be identified in at least some embodiments, such as respective weights to be assigned to factors of the kind discussed in the context of FIG. 4. In embodiments in which machine learning model-generated scores (or scores generated using rule processing systems) are used to select transactions for deferral, the score threshold to be used may have to be identified. In at least some embodiments, the score threshold itself may be time-varying.

Values for one or more blockchain implementation related parameters may have to be selected in different embodiments. For example, the number of transaction records which are to be included in a single block (block-transaction-count) and/or a minimum interval between the additions of successive blocks (block-addition-interval) 714 may have to be selected in the depicted embodiment. The transaction record count per block, and the interval between block additions, may affect the delay encountered between the submission of a transaction request and the time at which a record of the request becomes visible to a client who wishes to verify that the transaction request was recorded.

In at least one embodiment, the complexity 716 of the computations required to add a block to a blockchain may be tunable—e.g., a more difficult set of hashing or other calculations may result in longer delays between the time that a transaction request is received and the time that it is recorded, and may also impact the total number of miners interested in participating in blockchain maintenance (which may in turn result in changing the costs associated with the blockchain).

In embodiments in which miners external to the provider network at which workload management is being performed are being compensated for their computations, the compensation rates 718 or policies may have to be selected. In at least one embodiment, the rates may be dynamically modified, e.g., a lower level of compensation may be provided during time intervals in which the demand for deferrals is low, while higher compensation may be provided during intervals in which the demand for deferrals is high.

Depending on the application, the fraction or subset 720 of transaction details (e.g., parameter values) which are to be made publicly visible via the blockchain may be adjusted in various embodiments. For example, financial or security related information (such as credit card numbers or the like, home addresses to be used for delivering purchased items, etc.) may be obfuscated or hidden, while at least some information that enables a client to verify that the requested transaction was recorded on their behalf may be left in human-readable form.

In embodiments in which multiple blockchain services or deferral resource groups are available, and the workload management service is responsible for managing transactions of several different applications, the mappings 722 between applications and blockchain services (i.e., which service is to be used for which application) may have to be determined in the depicted embodiment. In at least one embodiment, reasonable or optimal values for one or more of the parameters shown in FIG. 7 (such as block-transaction-count or block-addition-interval) may be learned using machine learning algorithms. In some embodiments, values for configuration settings other than those shown in FIG. 7 may be selected for transaction deferral.

Use of Blockchain-Based Deferrals by External Entities

In some embodiments in which blockchain-based transaction deferrals are performed by a workload management service of a provider network, the back end transaction processing systems of the applications to which the transactions are directed may also be implemented at the provider network itself. In other embodiments, at least some of the work requested may be handled using resources external to the provider network; that is, the functionality of the workload management service may still be employed regardless of the locations of resources used for the application logic. In at least one embodiment, it may be possible for service providers using resources external to the provider network to utilize metadata generated at the workload management service, such as trust scores generated for clients of provider network services, to make transaction deferral decisions.

Figure 8:
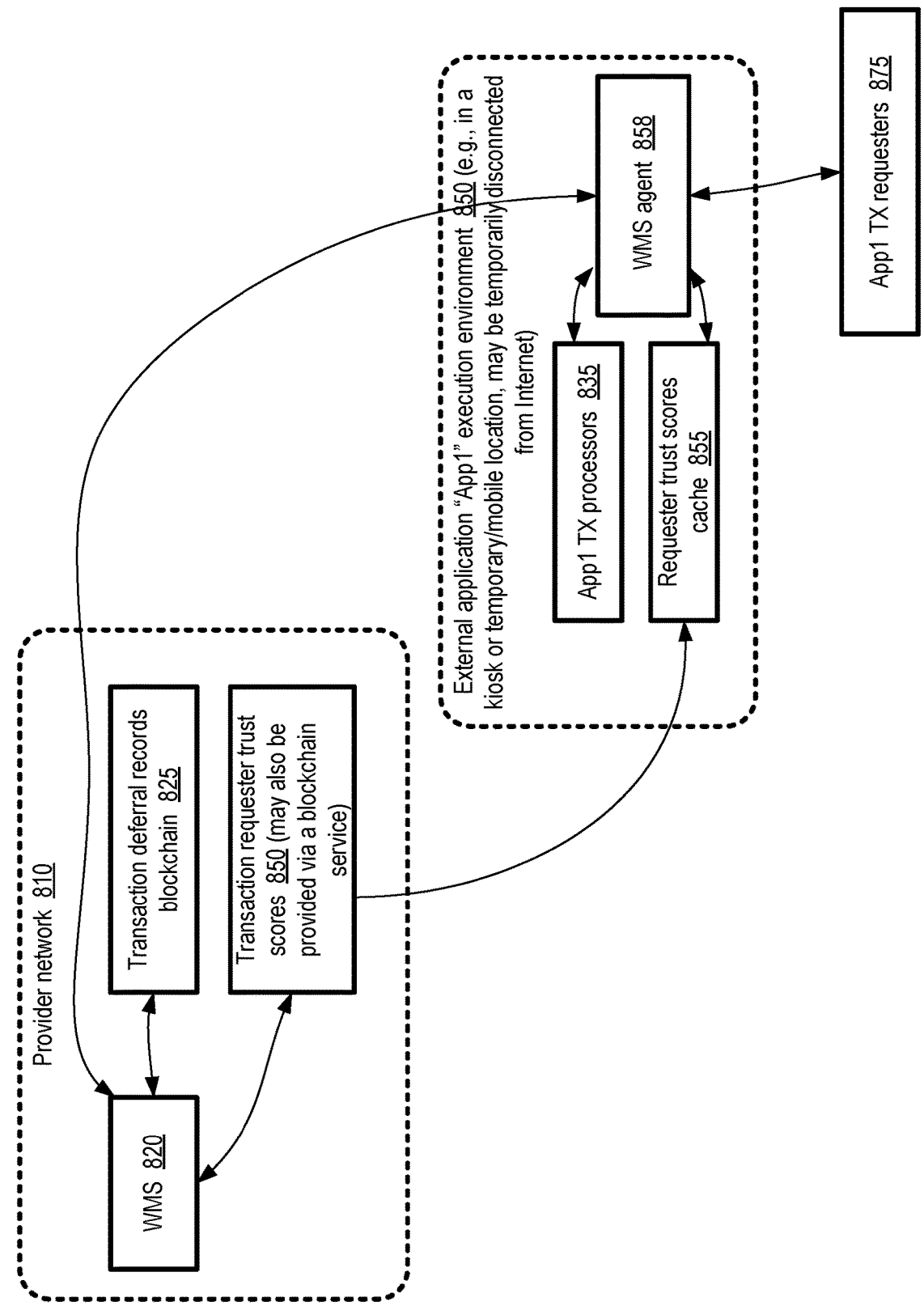
FIG. 8 illustrates an example scenario in which trust scores generated at a provider network with respect to transaction requesters may be accessed for handling application workloads external to the provider network using blockchain-based deferral, according to at least some embodiments.

FIG. 8 illustrates an example scenario in which trust scores generated at a provider network with respect to transaction requesters may be accessed for handling application workloads external to the provider network using blockchain-based deferral, according to at least some embodiments. In the depicted embodiment, a provider network 810 includes a workload management service 820. A blockchain 825 used for recording transaction deferral records may be implemented within the provider network. Respective trust scores 850 may be generated for various clients of the provider network and used when making decisions as to whether the clients' transactions should be selected as candidates for blockchain-based deferrals in the depicted embodiment. A client may be given a high trust score, for example, if the client is a long-standing customer of various provider network services, with no outstanding bills, or if the client is a member in good standing of a frequent-users club associated with a particular service of the provider network 810.

In the depicted example scenario, an application App1 may be run by an application provider using resources at an external (with respect to the provider network) execution environment 850. For example, App1 may comprise a payment processing application for goods or services being provided in a kiosk or a temporary/mobile location, run at least in part using computing devices or processors 835 which may temporarily become disconnected from the Internet and/or from the provider network. In order to enable to deferral of App1 transactions using the blockchain 825, an agent 858 of the workload management service 820 may be instantiated at the execution environment 850.

During periods of normal operation in which connectivity is not disrupted, the agent 850 may communicate with the WMS 820, obtaining trust scores for at least some App1 transaction requesters 875 for whom trust scores may have been generated at the provider network. The execution environment 850 may also comprise a local cache 855 of requester trust scores in the depicted embodiment, into which at least a subset of the WMS's trust score repository may be copied. At least during time intervals in which connectivity to the provider network is lost (which may be referred to as offline intervals of the App1 provider), the cache 855 may be used to select App1 transaction requests as candidates for deferral. Consider an example scenario in which the execution environment 850 comprises one or more computing devices in a food truck, and App1 is a payment processing application for food items sold from the truck. If a customer C1 wishes to make a payment for a particular food item at the truck, the App1 transaction processors 835 are too busy or unavailable, and if the connectivity between the food truck and the provider network is lost, a decision as to whether the payment transaction should be deferred may have to be made using locally-accessible resources. If an entry indicating that C1 has a high trust score is available in the cache 855, the risk associated with deferring the payment may be low enough that the payment may be deferred even though the payment processing resources are not able to deduct the payment amount immediately. When connectivity is eventually restored, and the App1 processing resources are again able to handle payment requests, normal operations may be resumed in the example scenario.

Methods for Workload Management Using Blockchain-Based Transaction Deferrals

Figure 9:
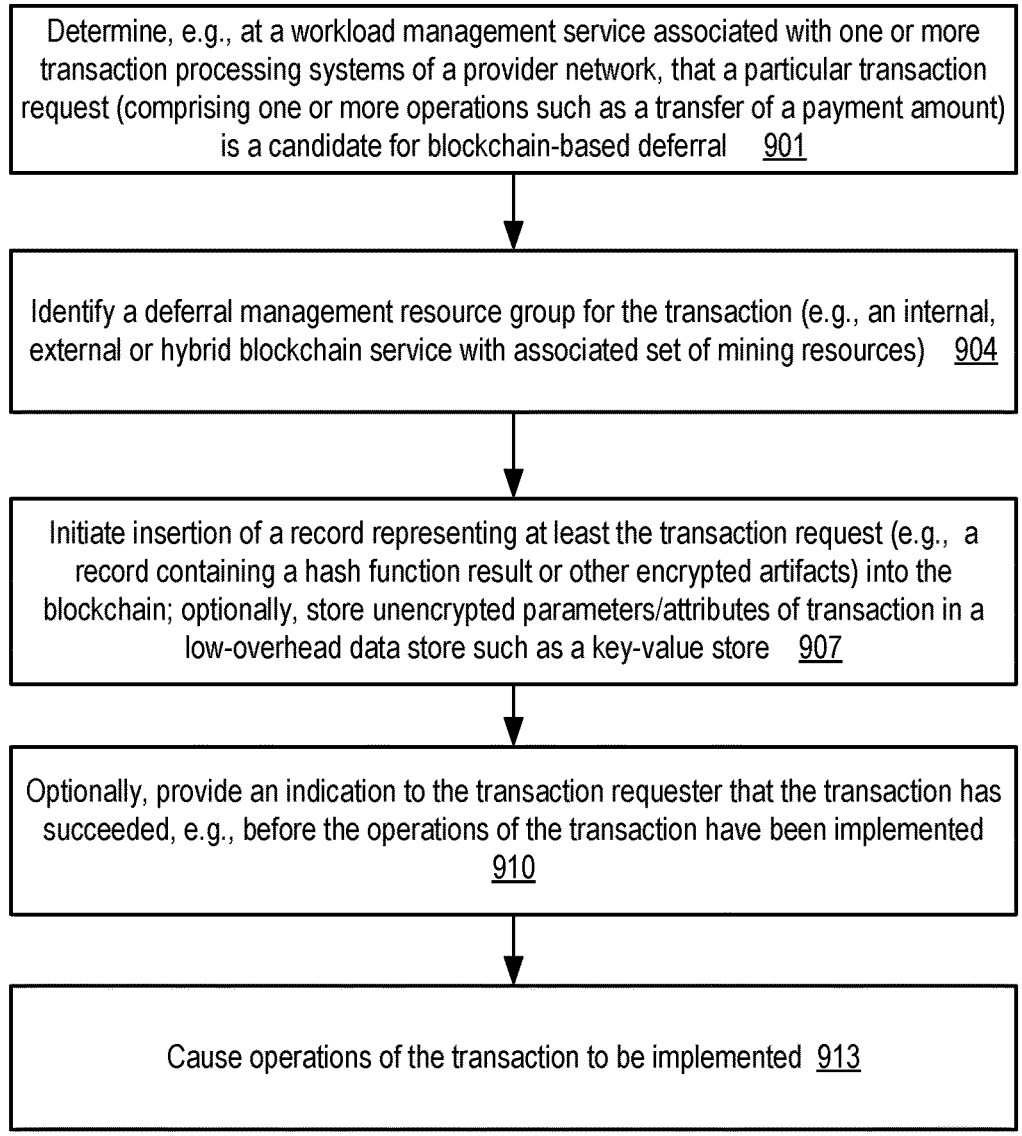
FIG. 9 is a flow diagram illustrating aspects of operations that may be performed to manage workloads using blockchain-based transaction deferrals, according to at least some embodiments.

FIG. 9 is a flow diagram illustrating aspects of operations that may be performed to manage workloads using blockchain-based transaction deferrals, according to at least some embodiments. As shown in element 901, a determination may be made, for example at a workload management service configured for one or more transaction processing systems of a provider network, that a particular transaction request comprising one or more operations such as the transfer of a payment amount is a suitable candidate for blockchain-based deferral. As discussed earlier, e.g., in the context of FIG. 4, any combination of numerous factors may be taken into account when such a determination is made—e.g., information about the requester may be considered, information about the workload level of the targeted transaction processing system may be considered, and so on. In one embodiment, at least during some time intervals, all transaction requests may be considered candidates for blockchain-based deferral, so no extra work may be needed to determine that a given request is to be deferred.

A deferral management resource group with a blockchain that can be used to store a permanent, publicly-accessible record of the transaction request may be identified (element 904). The deferral management resource group may comprise one or more blockchain services in some embodiments, such as a blockchain service comprising resources internal to the provider network at which the workload management service is implemented, an external blockchain service outside the provider network, or a hybrid blockchain service which utilizes resource internal and external to the provider network.

The insertion of a record representing at least the transaction request at a blockchain may be initiated in the depicted embodiment (element 907). The record may, for example, contain a result of a hash function applied to at least some attributes/parameters of the transaction request, or some other encrypted version of a portion or all of the transaction request. In at least some embodiments, a second record or descriptor of the transaction request may be stored, for example in a low-overhead data store such as a key-value store. In some embodiments, a single insertion into the blockchain may represent multiple deferred transaction requests: e.g., a group of N transaction requests that are received within some short time interval may be represented by a single blockchain record. Such group insertions may help reduce the overhead associated with the blockchain operations in various embodiments, as fewer insertion requests may have to be processed overall, and fewer network requests may have to be transmitted. In at least one embodiment, information about a particular transaction request may not necessarily be restricted to one blockchain record—e.g., a given transaction request's information may be replicated in multiple blockchain records, or respective portions of a transaction request's information may be stored in separate blockchain records.

An indication may optionally be provided to the transaction requester that the transaction has succeeded (element 910), e.g., before at least some of the operations indicated in the transaction request have been performed. Asynchronously with respect to the success indication, the workload management service may cause operations of the transaction to be implemented (element 913) in various embodiments. For some types of applications, such as audit logging applications, success indications may not be required; instead, the work of the transaction may simply be completed at some point, e.g., after the blockchain record has been stored.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations.

Use Cases

The techniques described above, of storing unmodifiable publicly-accessible records of deferred transaction requests at a blockchain to delay the utilization of back end transaction processing resources which may be temporarily overloaded or unavailable, may be useful in a variety of scenarios. Many Internet-based retailing/wholesaling organizations may have wide fluctuations in transaction workloads, e.g., based on upcoming holidays, special shopping events, and so on. Provisioning enough resources to handle all the possible spikes in transaction workloads may be impracticable. Using blockchains, whose computations may typically be processed using large distributed networks instead of specialized transaction processing systems, it may become possible to store all the information needed to verify that a transaction request was submitted and to (eventually) implement the requested transaction without overloading the transaction processing systems themselves. Potential loss of transactions and corresponding customer dissatisfaction may thereby be avoided. Blockchains may also be used in a similar fashion for audit logging purposes, e.g., for recording events such as log-ins and log-outs, timely submission of documents, and so on.

Illustrative Computer System

Figure 10:
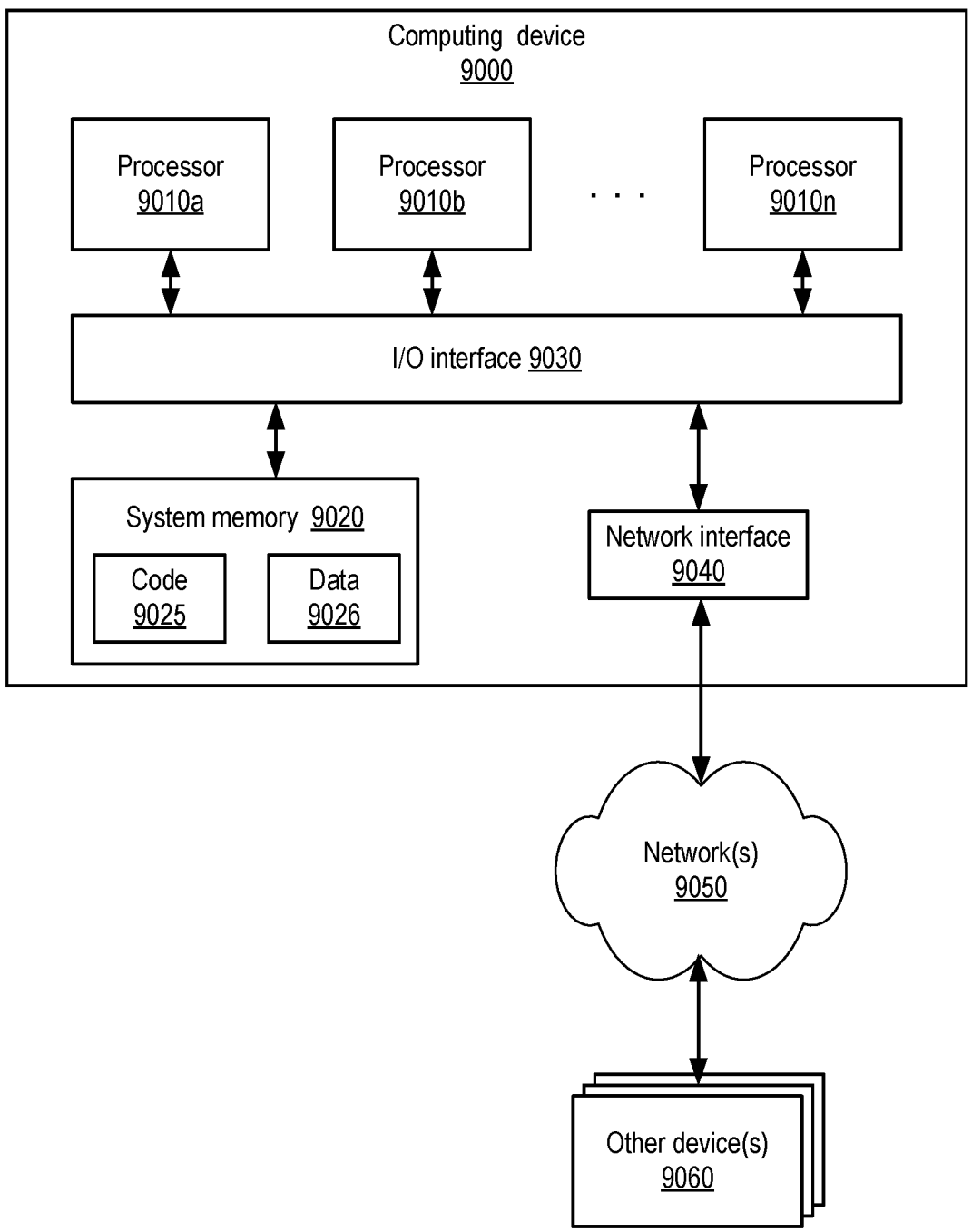
FIG. 10 is a block diagram illustrating an example computing device that may be used in at least some embodiments.

In at least some embodiments, a server that implements a portion or all of one or more of the technologies described herein, including the various components of a workload management service, as well as transaction processing systems, trainers and executors of machine learning models, rule processing systems and the like may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD- ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a workload management service;
wherein the one or more computing devices are configured to:
determine that a particular transaction request directed to a first application is a candidate for blockchain-based deferral, wherein the particular transaction request indicates an operation to be implemented on behalf of a particular entity;
identify a deferral resource group for the particular transaction request, wherein the deferral resource group comprises a blockchain;
initiate an insertion of a first record representing at least the particular transaction request into the blockchain;
prior to implementation of the operation, provide an indication to the particular entity, via a programmatic interface, that the operation has succeeded; and
cause an implementation of the operation to be initiated, wherein the implementation comprises accessing at least one record representing the particular transaction request.

2. The system as recited in claim 1, wherein to determine that the particular transaction request is a candidate for blockchain-based deferral, the one or more computing devices are configured to perform one or more of: (a) determining that the particular entity is a member of a particular category of clients of a network-accessible service, (b) determining that a measured resource usage metric of a set of resources associated with the first application exceeds a threshold, (c) predicting a probability associated with a workload level of the first application during a time interval, or (d) determining that one or more resources associated with the first application are unavailable.

3. The system as recited in claim 1, wherein to determine that the particular transaction request is a candidate for blockchain-based deferral, the one or more computing devices are configured to examine a score associated with the particular transaction request, wherein the score is produced by one or more of (a) a machine learning model or (b) a rule processing system.

4. The system as recited in claim 1, wherein the first record comprises respective encrypted representations of one or more parameters of the particular transaction request.

5. The system as recited in claim 1, wherein the first application comprises a payment processing application.

6. A method, comprising:
performing, at one or more computing devices:
receiving a particular request directed to a first application, wherein the particular request indicates an operation to be implemented on behalf of a particular requester;
initiating an insertion of a first record representing at least the particular request into a blockchain;
prior to implementation of the operation, providing an indication to the particular requester, via a programmatic interface, that the operation has succeeded; and
causing an implementation of the operation to be initiated, wherein the implementation comprises accessing at least one record representing the particular request.

7. The method as recited in claim 6, wherein determining that the particular request is a candidate is based at least in part on: (a) determining that the particular requester is a member of a particular category of clients of a network-accessible service, (b) determining that a measured resource usage metric of a set of resources associated with the first application exceeds a threshold, (c) predicting a probability associated with a workload level of the first application during a time interval, or (d) determining that one or more resources associated with the first application are unavailable.

8. The method as recited in claim 6, wherein determining that the particular transaction request is a candidate is based at least in part on output produced by one or more of: (a) a machine learning model or (b) a rule processing system.

9. The method as recited in claim 6, wherein the first record comprises respective encrypted representations of one or more parameters of the particular request.

10. The method as recited in claim 9, further comprising performing, by the one or more computing devices:
causing a second record of the particular request to be stored at a data store, wherein the second record comprises respective representations of the one or more parameters; and
causing an indication of a mapping between the first record and the second record to be stored, wherein the implementation of the operation comprises accessing one or more of: (a) the second record or (b) the mapping.

11. The method as recited in claim 10, wherein the data store comprises a key value store.

12. The method as recited in claim 6, further comprising performing, by the one or more computing devices:
providing an indication to the particular requester, via the programmatic interface, that at least a portion of processing associated with the particular request has been deferred.

13. The method as recited in claim 6, further comprising performing, by the one or more computing devices:
in response to a query pertaining to the particular request, providing an indication of at least a portion of the first record.

14. The method as recited in claim 6, further comprising performing, by the one or more computing devices:
receiving a blockchain maintenance participation request, via a programmatic interface, indicating one or more resources usable for blockchain computations; and
enabling the one or more resources to be utilized for a blockchain computation.

15. The method as recited in claim 6, further comprising performing, by the one or more computing devices:

providing an indication, via a programmatic interface, of a compensation for a resource contributed by an entity for blockchain computations associated with the first application.

16. A non-transitory computer-accessible storage medium storing program instructions that when executed on one or more processors cause the one or more processors to:

determine that a particular request associated with a first application is a candidate for blockchain-based deferral;

initiate an insertion of a first record representing at least the particular request at a blockchain;

prior to implementation of the operation, providing an indication to the particular requester, via a programmatic interface, that the operation has succeeded; and cause an implementation of an operation indicated in the request to be initiated, wherein the implementation comprises accessing at least one record representing the particular request.

17. The non-transitory computer-accessible storage medium as recited in claim 16, wherein the particular request is associated with a particular requester, and wherein the instructions when executed on one or more processors cause the one or more processors to:

generate a respective trust score corresponding to individual ones of one or more requesters including the particular requester; and cause the respective trust scores to be cached at a first device of a particular provider, wherein a cached trust score is usable to respond to a request directed to the particular provider during at least a first offline interval of the particular provider.

18. The non-transitory computer-accessible storage medium as recited in claim 16, wherein the instructions when executed on one or more processors cause the one or more processors to:

determine, based at least in part on a particular class of requester associated with a second request directed to the first application, that the second request is not a candidate for blockchain-based deferral.

19. The non-transitory computer-accessible storage medium as recited in claim 16, wherein the first application comprises storing, corresponding to individual ones of a plurality of events or actions, a respective audit log record.

20. The non-transitory computer-accessible storage medium as recited in claim 16, wherein to determine that the particular request is a candidate for blockchain-based deferral, the instructions when executed on the one or more processors cause the one or more processors to:

examine output produced by one or more of: (a) a machine learning model or (b) a rule processing system.

* * * * *